UNITED STATES PATENT OFFICE.

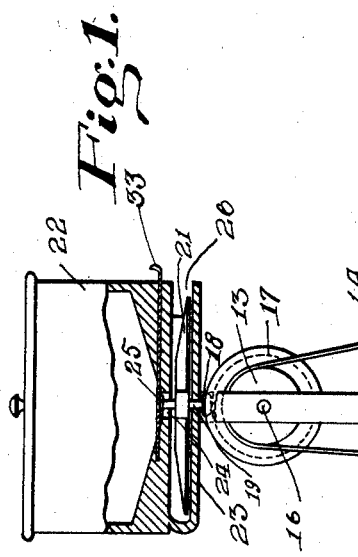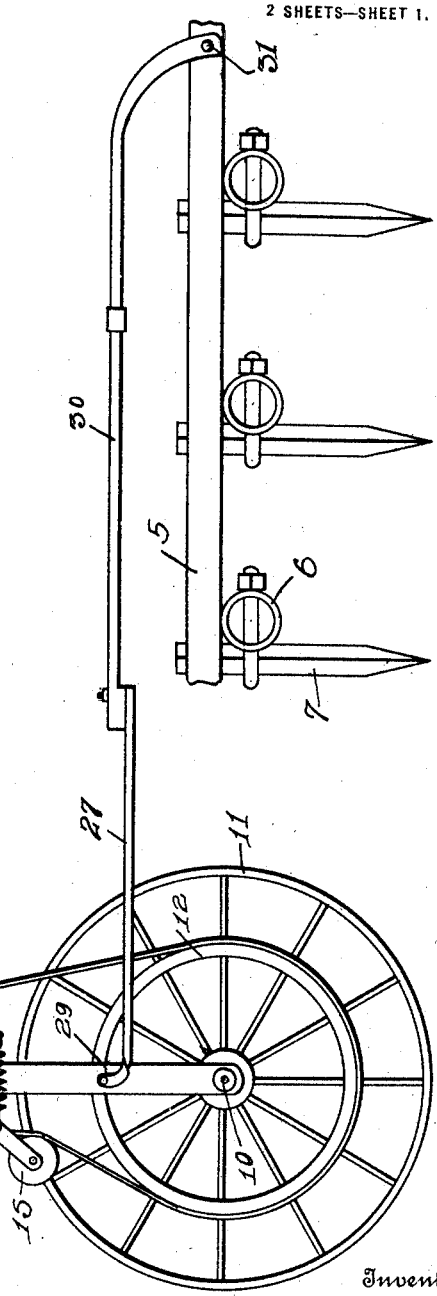

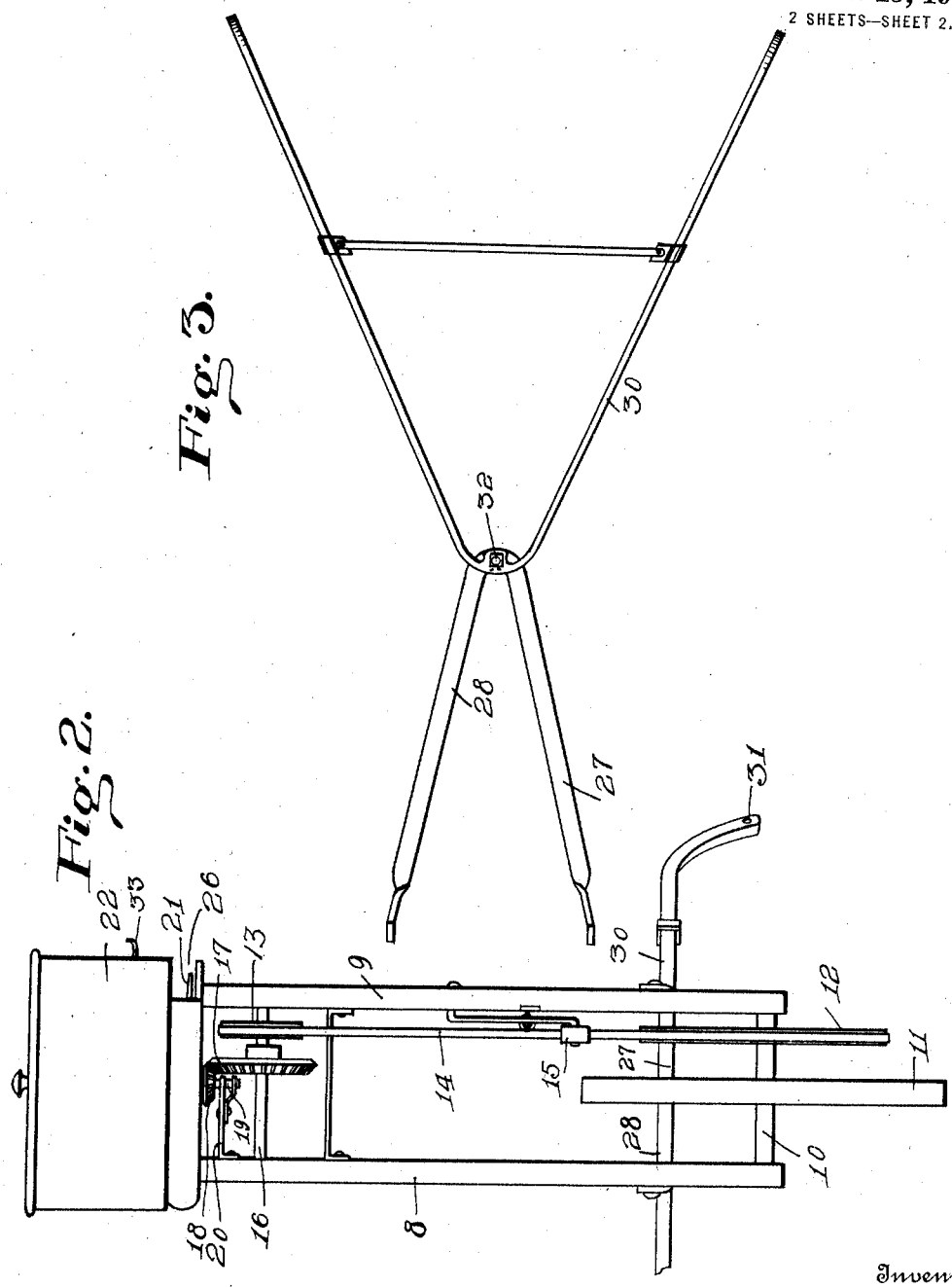

JULIUS PLOEN, OF GREEN ISLAND, IOWA.

HARROW-TRAILING SEEDER.

1,396,877.          Specification of Letters Patent.     Patented Nov. 15, 1921.

Application filed May 6, 1920. Serial No. 379,339.

*To all whom it may concern:*

Be it known that I, JULIUS PLOEN, a citizen of the United States, residing at Green Island, in the county of Jackson and State of Iowa, have invented a new and useful Harrow-Trailing Seeder, of which the following is a specification.

This invention relates to agricultural machines and more particularly to machines known as seeders and planters.

The primary object of the invention is to provide a seeding device adapted for attachment to the ordinary cultivator or harrow, now in common use, thus providing a machine to accomplish the seeding and harrowing operation simultaneously, thereby reducing the number of hands necessary to accomplish the planting to a minimum.

A further object of the invention is to provide a seeder of this character which will evenly broadcast the seed, the machine having novel means to cut off the supply of seed, at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of a seeder constructed in accordance with the present invention, the same being shown as attached to a harrow.

Fig. 2 is a rear elevational view of the same.

Fig. 3 is the attaching means employed for attaching the seeder to the harrow.

Referring to the drawings in detail, the harrow to which the seeder is secured, includes the side bars 5 to which are secured the spike supporting rods 6, the spikes or teeth being indicated by reference character 7.

The seeder comprises the spaced supporting arms 8 and 9, the lower ends of which arms being provided with suitable bearings to accommodate the shaft 10 on which the supporting wheel 11 is secured, so that the shaft or axle 10 will revolve with the wheel 11.

Secured to the shaft 10, in spaced relation with the wheel 11, is a pulley 12 which communicates motion to the pulley 13, through the medium of the belt 14, passing over the pulleys 12 and 13, there being an idle roller 15, provided for contacting with the belt 14 for insuring against the belt slipping over the pulley.

Operating adjacent the upper ends of the supporting arms 8 and 9, is a shaft 16 on which is supported the beveled pinion 17, which in turn is in mesh with the beveled pinion 18 carried by the lower end of the stub shaft 19, that is supported by means of the bracket 20. From the foregoing it is obvious that rotary movement of the beveled pinion 17 is communicated to the beveled pinion 18 and the stub shaft 19 to cause the operation of the distributing arms 21 which are supported intermediate the stub shaft.

The hopper forming a part of the seeder and which is indicated by the reference character 22, is positioned on the upper ends of the parallel arms 8 and 9, and as shown this hopper is provided with an auxiliary bottom wall 23 disposed in spaced relation with the bottom of the hopper, to provide a housing for the distributing arms, the space between the auxiliary bottom 23 and bottom of the hopper being sufficient to accommodate the distributing arms 21 to permit of free rotation thereof, within this housing.

Formed in the bottom of the hopper is an opening 24 through which the seed passes from the hopper to the distributing arms 21, and as shown, this opening is partially closed by the disk 25 which is carried by the upper end of the shaft 19, so that rotary movement of the disk causes the seed to be fed through the discharge opening 24, to prevent clogging of the seed at the point of delivery to the distributing arm.

The forward portion of the housing, which houses the distributing arm, is open as at 26 to permit the seed being planted to be thrown from the housing, by the distributing arms 21, to broadcast the seed and prevent the same from being deposited, irregularly over the ground surface being planted.

The means for attaching the seeder to the harrow, includes a yoke comprising the arms 27 and 28, which are apertured as at 29, to accommodate securing bolts by means of which the yoke may be secured to the arms 8 and 9, in a manner to support the arms 8 and 9 in vertical positions. Associated with this yoke, is a relatively large yoke providing the spaced arms 30, the forward ends of the arms being apertured as at 31, to permit the same to be secured to the harrow.

These yokes are connected by means of the bolt 32 so that one yoke may be adjusted with relation to the other, the bolt 32 being provided to secure the yokes in such positions of adjustment.

In the operation of the device, the seeder is secured to the harrow in a manner as described, and the harrow is moved along the surface to be planted in the usual manner, whereupon the soil is loosened, and the seed, contained in the hopper 22 is distributed over the ground surface, by means of the distributing arms 21 revolving in their housings.

It might be further stated that the opening through which the seed discharges, is controlled by means of the closure, indicated at 33, so that the discharge of seed may be cut off at the will of the operator.

Having thus described the invention, what is claimed as new is:—

In combination with a support, a seeder including a pair of supporting arms, a wheel supported between the arms, a hopper supported by the arms, a relatively large yoke including a pair of diverging arms, said arms having curved extremities connected to the support, a second yoke including diverging arms having their free ends connected to the seeder, and means for adjustably connecting the yokes.

In testimony that I claim the foregoing as my own, I have hereto affixed my signature in the presence of two witnesses.

JULIUS PLOEN.

Witnesses:
EDWARD J. STEWART,
HENRY F. PLOEN.